United States Patent
Chen et al.

(10) Patent No.: US 10,306,615 B2
(45) Date of Patent: May 28, 2019

(54) CONTROL-LESS DATA TRANSMISSION FOR NARROW BAND INTERNET OF THINGS

(71) Applicant: MEDIATEK INC., Hsinchu (TW)

(72) Inventors: Po-Ying Chen, Hsinchu (TW); Xiu-Sheng Li, Hsinchu (TW)

(73) Assignee: MEDIATEK INC., HsinChu (TW)

( * ) Notice: Subject to any disclaimer, the term of this patent is extended or adjusted under 35 U.S.C. 154(b) by 78 days.

(21) Appl. No.: 15/371,501

(22) Filed: Dec. 7, 2016

(65) Prior Publication Data

US 2017/0171841 A1 Jun. 15, 2017

Related U.S. Application Data

(60) Provisional application No. 62/264,966, filed on Dec. 9, 2015.

(51) Int. Cl.
*H04L 1/00* (2006.01)
*H04L 1/18* (2006.01)
(Continued)

(52) U.S. Cl.
CPC ......... *H04W 72/042* (2013.01); *H04L 1/1812* (2013.01); *H04L 1/1816* (2013.01);
(Continued)

(58) Field of Classification Search
CPC ........... H04W 72/042; H04W 72/0446; H04W 72/0413; H04W 72/044; H04L 1/1812;
(Continued)

(56) References Cited

U.S. PATENT DOCUMENTS 9,445,338 B2 * 9/2016 He .................. H04W 4/70
10,104,651 B2 * 10/2018 Chen ............... H04L 5/0048
(Continued)

OTHER PUBLICATIONS

EPO, Search Report for the EP patent application 16202922.7 dated Apr. 24, 2017 (12 pages).
(Continued)

*Primary Examiner* — Brian T O Connor
(74) *Attorney, Agent, or Firm* — Imperium Patent Works; Zheng Jin

(57) ABSTRACT

Various methods of control-less data transmission for NB-IoT/NR devices have been proposed to improve efficiency and system capacity in cellular networks. In a first embodiment, a PDCCH-less operation is performed between eNB and UE. UE will blindly decode some PDSCH subframes according to the parameters configured by higher layer. In a second embodiment, a PDCCH-lite operation is performed between eNB and UE. UE may use one PDCCH to schedule more than one subsequent PDSCH resources. In a third embodiment, an extremely compact DCI (E-DCI) format is used between eNB and UE. When the same assignment parameters are used by the eNB for the UE, DCI overhead may be reduced by E-DCI. In a fourth embodiment, direct data transmission in PDCCH is performed between eNB and UE. Data transmission is directly transmitted by PDCCH with a new DCI format.

20 Claims, 7 Drawing Sheets

PDCCH-LESS OPERATION

(51) Int. Cl.
*H04L 5/00* (2006.01)
*H04W 72/04* (2009.01)
*H04W 72/12* (2009.01)

(52) U.S. Cl.
CPC .......... *H04L 1/1854* (2013.01); *H04L 5/0007* (2013.01); *H04L 5/0053* (2013.01); *H04L 5/0055* (2013.01); *H04L 5/0091* (2013.01); *H04W 72/0446* (2013.01); *H04W 72/1289* (2013.01); *H04L 1/0026* (2013.01); *H04L 1/188* (2013.01); *H04L 1/189* (2013.01); *H04L 1/1822* (2013.01); *H04L 1/1825* (2013.01); *H04L 1/1896* (2013.01); *H04W 72/0413* (2013.01)

(58) Field of Classification Search
CPC ..... H04L 5/0055; H04L 1/189; H04L 1/1825; H04L 1/1822; H04L 1/0026; H04L 1/1896; H04L 5/0007
See application file for complete search history.

(56) References Cited

U.S. PATENT DOCUMENTS

| | | | |
|---|---|---|---|
| 2007/0168827 A1 | 7/2007 | Lohr et al. | 714/749 |
| 2007/0171849 A1* | 7/2007 | Zhang | H04L 1/0026 370/310 |
| 2011/0047429 A1 | 2/2011 | Kashima et al. | 714/748 |
| 2013/0223299 A1 | 8/2013 | Yang et al. | 370/280 |
| 2014/0071868 A1 | 3/2014 | Bergquist et al. | 370/311 |
| 2015/0263829 A1* | 9/2015 | Nguyen | H04W 72/1289 370/280 |
| 2017/0134880 A1* | 5/2017 | Rico Alvarino | H04W 4/70 |
| 2017/0187494 A1* | 6/2017 | Tirronen | H04L 1/1671 |
| 2018/0070265 A1* | 3/2018 | Seo | H04W 28/048 |

OTHER PUBLICATIONS

Taiwan IPO, office action for the TW patent application 106138273 (no English translation is available) dated Apr. 18, 2018 (8 pages).

* cited by examiner

PDCCH-LESS OPERATION

PDCCH-LITE OPERATION

| DCI contents | May exist in NBIoT normal DCI | May exist in NBIoT extreme compact DCI |
|---|---|---|
| UL/DL flag | V | V |
| PRB assignment | V | X |
| Repetition number | V | X |
| MCS | V | X |
| RV | V | X |
| NDI | V | V |
| HARQ ACK resource offset | V | V |
| Others | ? | ? |

EXTREMELY COMPACT DCI

DOWNLINK WITH EXTREMELY COMPACT DCI

UPLINK WITH EXTREMELY COMPACT DCI

DATA TRANSMISSION IN PDCCH

DATA TRANSMISSION IN PDCCH WITH A NEW DCI

CONTROL-LESS DATA TRANSMISSION FOR NARROW BAND INTERNET OF THINGS

CROSS REFERENCE TO RELATED APPLICATIONS

This application claims priority under 35 U.S.C. § 119 from U.S. Provisional Application No. 62/264,966 entitled "Control-less Data Transmission for Narrow Band Internet of Things," filed on Dec. 9, 2015, the subject matter of which is incorporated herein by reference.

TECHNICAL FIELD

The disclosed embodiments relate generally to physical downlink control channel (PDCCH), and, more particularly, to control-less data transmission for Narrow Band Internet of Things and New Radio (NB-IoT/NR).

BACKGROUND

In 3GPP Long-Term Evolution (LTE) networks, an evolved universal terrestrial radio access network (E-UTRAN) includes a plurality of base stations, e.g., evolved Node-Bs (eNBs) communicating with a plurality of mobile stations referred as user equipment (UEs). Orthogonal Frequency Division Multiple Access (OFDMA) has been selected for LTE downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition. In LTE networks, Physical Downlink Control Channel (PDCCH) is used for dynamic downlink (DL) or uplink (UL) scheduling of Physical Downlink Shared Channel (PDSCH) or Physical Uplink Shared Channel (PUSCH) transmission. The DL/UL scheduling information carried by PDCCH is referred to as downlink control information (DCI).

Various methods of control-less transmission have been adopted in mobile communication networks to improve efficiency and system capacity. For Wideband Code Division Multiple Access (WCDMA) used in Universal Mobile Telecommunications System (UMTS), blind transport format detection (BTFD) is adopted. UE will blindly detect the possible transport format without explicit signaling. The possible payload sizes are 12.2 kbps, 7.95 kbps, and 1.95 kbps. For High Speed Downlink Packet Access (HSDPA), a control channel (HS-SCCH) is not transmitted for the initial transmission of a data channel (HS-PDSCH). UE will blindly decode the data on HS-PDSCH with predefined control information, under maximum of four transport block size ranging from 137~1483. If the UE is unable to blindly decode the initial transmission successfully, then the data shall be retransmitted accompanied by HS-SCCH type-2. For LTE, semi persistent scheduling (SPS) has been proposed. The eNB can configure UE in SPS and use PDCCH to activate SPS. The UE will periodically decode the PDSCH in the SPS subframe configured by higher layer, e.g., via radio resource control (RRC) signaling, by the activation PDCCH. The UE does not do blind detection but follows a predefined transport block size indicated by DCI.

Narrowband IoT (NB-IoT) is a Low Power Wide Area Network (LPWAN) radio technology standard that has been developed to enable a wide range of devices and services to be connected using cellular telecommunications bands. NB-IoT is a narrowband radio technology designed for the Internet of Things (IoT), and is one of a range of Mobile IoT (MIoT) technologies standardized by the 3GPP. For cellular narrowband Internet of Things and New Radio (NB-IoT/NR), it can be envisioned for some applications, there is only a small amount of data for infrequent traffic such as acknowledgement and network command/RRC signaling. The defined payload size is 12 bytes/message for uplink and 8 bytes/message for downlink. The uplink and downlink peak rate ranges from 20~250 kbps. Large control overhead incurs for this kind of small packet transmission. Therefore, it is desirable to introduce control-less transmission to avoid unnecessary overhead and increase system capacity for cellular NB-IoT/NR.

SUMMARY

Various methods of control-less data transmission for NB-IoT/NR devices have been proposed in cellular network to improve efficiency and system capacity. In a first embodiment, a PDCCH-less operation is performed between eNB and UE (NB-IoT/NR device). UE will blindly decode some PDSCH subframes according to the parameters configured by higher layer. In a second embodiment, a PDCCH-lite operation is performed between eNB and UE (NB-IoT/NR device). UE may use one PDCCH to schedule more than one subsequent PDSCH resources. In a third embodiment, an extremely compact DCI (E-DCI) format is used between eNB and UE (NB-IoT/NR device). When the same assignment parameters are used by the eNB for the UE, DCI overhead may be reduced by E-DCI. In a fourth embodiment, direct data transmission in PDCCH is performed between eNB and UE (NB-IoT/NR device). Data transmission is directly transmitted by PDCCH with a new DCI format.

In one embodiment, a UE (e.g., an NB-IoT/NR device) obtains a set of PDSCH-related parameters in a cellular network. The UE receives a PDCCH-less data transmission over a PDSCH from a base station. The UE decodes the data transmission based on the set of PDSCH-related parameters without receiving scheduling information of the PDSCH over a PDCCH. The UE performs HARQ on the data transmission. The UE transmits an HARQ ACK if the UE successfully decodes the data transmission. The UE does not transmit an HARQ NACK if the UE unsuccessfully decodes the data transmission.

In another embodiment, a UE (e.g., an NB-IoT/NR device) receives scheduling information over a PDCCH in a cellular network. The UE receives a first data transmission over a first PDSCH based on a first set of PDSCH-related parameters. The UE receives a second data transmission over a second PDSCH based on a second set of PDSCH-related parameters. The scheduling information comprises information of both the first set of PDSCH-related parameters and the second set of PDSCH-related parameters.

In another embodiment, a UE (e.g., an NB-IoT/NR device) receives a first normal downlink control information (DCI) over a first physical downlink control channel (PDCCH) in a cellular network. The UE receives or transmits a first data transmission over a first physical downlink/uplink shared channel (PDSCH/PUSCH) based on a set of PDSCH/PUSCH parameters in the first normal DCI. The UE receives a second extremely compact DCI (E-DCI) over a second PDCCH. The E-DCI comprises a subset of PDSCH/PUSCH parameters. Finally, the UE receives or transmits a second data transmission over a second PDSCH/PUSCH based on the subset of PDSCH/PUSCH parameters in the second E-DCI as well as remaining PDSCH/PUSCH parameters in the first normal DCI.

In yet another embodiment, a UE (e.g., an NB-IoT/NR device) configures a transmission mode that is associated with a direct data transmission over a physical downlink control channel (PDCCH) in a cellular network. The UE monitors candidate PDCCHs over a predefined search space. The UE decodes downlink control information (DCI) from the candidate PDCCHs. The decoded DCI has a specific format associated with the transmission mode. Finally, the UE decodes the direct data transmission contained in the decoded DCI if the decoded DCI indicates the direct data transmission over the PDCCH.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
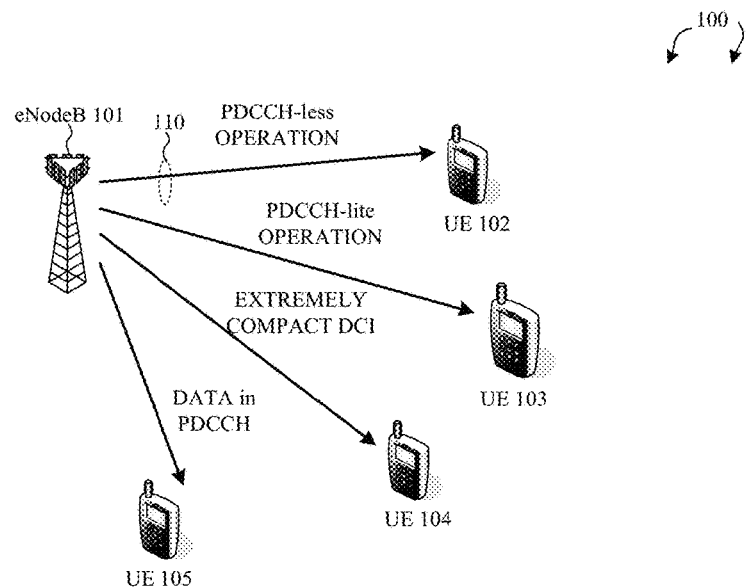
FIG. 1 illustrates a mobile communication network supporting control-less data transmission in accordance with one novel aspect.

FIG. 1 illustrates a mobile communication network 100 supporting control-less data transmission in accordance with one novel aspect. Mobile communication network 100 is a cellular system comprising a base station eNodeB 101 and a plurality of user equipment UE 102, UE 103, UE 104, and UE 105. When there is a downlink packet to be sent from eNodeB to UE, each UE gets a downlink assignment, e.g., a set of radio resources in a physical downlink shared channel (PDSCH). When a UE needs to send a packet to eNodeB in the uplink, the UE gets a grant from the eNodeB that assigns a physical uplink shared channel (PUSCH) consisting of a set of uplink radio resources. The UE gets the downlink or uplink scheduling information from a physical downlink control channel (PDCCH) that is targeted specifically to that UE. In addition, some of broadcast control information, such as system information blocks, random access response and paging information is also scheduled by PDCCH and is sent in PDSCH to all UEs in a cell. The downlink or uplink scheduling information, carried by PDCCH, is referred to as downlink control information (DCI).

In 3GPP LTE system based on OFDMA downlink, the radio resource is partitioned into subframes, each of which is comprised of two slots and each slot has seven OFDMA symbols along time domain. Each OFDMA symbol further consists of a number of OFDMA subcarriers along frequency domain depending on the system bandwidth. The basic unit of the resource grid is called Resource Element (RE), which spans an OFDMA subcarrier over one OFDMA symbol. A physical resource block (PRB) occupies one slot and twelve subcarriers, while a PRB pair occupies two consecutive slots. PDCCH or enhanced PDCCH (ePDCCH) is defined on certain location of the resource grid and is used to provide scheduling information including PDSCH/PUSCH subframes (PRB assignment), transport block size (TBS), modulation and coding schemes (MCS) etc.

For cellular narrowband Internet of Things and New Radio (NB-IoT/NR), it can be envisioned for some applications, there is only a small amount of data for infrequent traffic. Large control overhead incurs for this type of small packet transmission. Therefore, it is desirable to introduce control-less transmission to avoid unnecessary overhead and increase system capacity for cellular NB-IoT/NR. In LTE systems, semi persistent scheduling (SPS) has been proposed. The eNB can configure UE in SPS and use PDCCH to activate SPS. The UE will periodically decode the PDSCH in the SPS subframe configured by higher layer, e.g., via radio resource control (RRC) signaling, by the activation PDCCH. The UE does not do blind detection but follows a predefined transport block size indicated by DCI.

Though the SPS was originally defined in LTE for VoIP like application, the SPS operation may be applied as well in NB-IoT/NR to reduce control channel overhead. Especially for applications such as periodic reporting, SPS uplink may well fit in this type of traffic. Unlike SPS in LTE, SPS in NB-IoT/NR shall be able to be operated even when UE changes between power saving mode (PSM)/Idle Mode and Connected Mode.

In accordance with one novel aspect, various embodiments of control-less data transmission for NB-IoT/NR devices have been proposed. In a first embodiment, a PDCCH-less operation is performed between eNB 101 and the NB-IoT/NR device (UE 102). UE 102 will blindly decode some PDSCH subframes according to the parameters configured by higher layer. In a second embodiment, a PDCCH-lite operation is performed between eNB 101 and the NB-IoT/NR device (UE 103). UE 103 may use one PDCCH to schedule more than one subsequent PDSCH resources. In a third embodiment, an extremely compact DCI (E-DCI) format is used between eNB 101 and the NB-IoT/NR device (UE 104). When the same assignment parameters are used by eNB 101 for UE 104, DCI overhead may be reduced by E-DCI. In a fourth embodiment, direct data transmission in PDCCH is performed between eNB 101 and the NB-IoT/NR device (UE 105). Data transmission is directly transmitted by PDCCH with a new DCI format.

Figure 2:
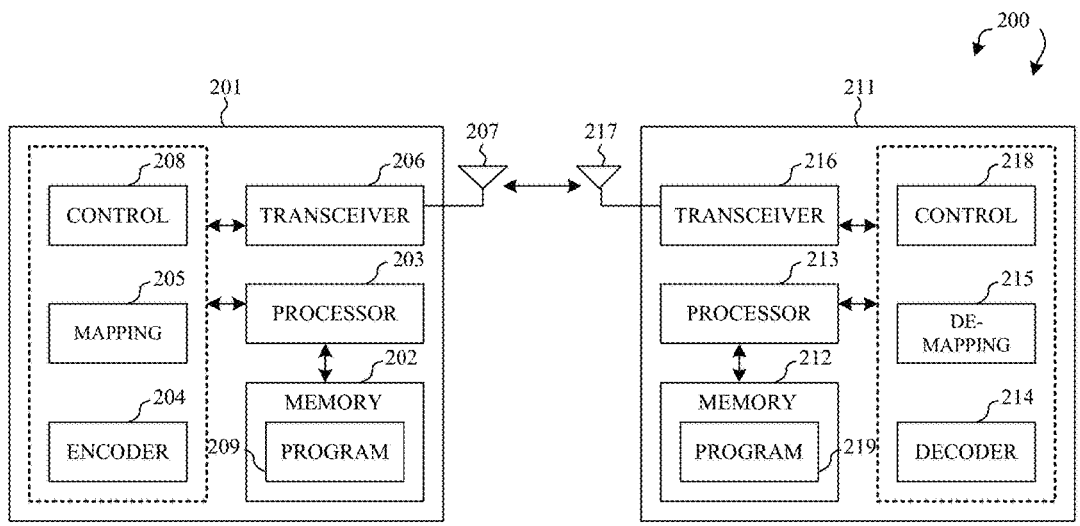
FIG. 2 is a simplified block diagram of a base station and a user equipment in accordance with embodiments of the present invention.

FIG. 2 illustrates simplified block diagrams of a base station 201 and a user equipment 211 in accordance with embodiments of the present invention. For base station 201, antenna 207 transmits and receives radio signals. RF transceiver module 206, coupled with the antenna, receives RF signals from the antenna, converts them to baseband signals and sends them to processor 203. RF transceiver 206 also converts received baseband signals from the processor, converts them to RF signals, and sends out to antenna 207. Processor 203 processes the received baseband signals and invokes different functional modules to perform features in base station 201. Memory 202 stores program instructions and data 209 to control the operations of the base station.

Similar configuration exists in UE 211 where antenna 217 transmits and receives RF signals. RF transceiver module 216, coupled with the antenna, receives RF signals from the antenna, converts them to baseband signals and sends them to processor 213. The RF transceiver 216 also converts received baseband signals from the processor, converts them to RF signals, and sends out to antenna 217. Processor 213 processes the received baseband signals and invokes different functional modules to perform features in UE 211. Memory 212 stores program instructions and data 219 to control the operations of the UE.

The base station 201 and UE 211 also include several functional modules and circuits to carry out some embodiments of the present invention. The different functional modules and circuits can be implemented by software, firmware, hardware, or any combination thereof. The function modules and circuits, when executed by the processors 203 and 213 (e.g., via executing program codes 209 and 219), for example, allow base station 201 to configure downlink control channel and transmit downlink control information to UE 211, and allow UE 211 to receive and decode the downlink control information accordingly. In one example, base station 201 configures a set of radio resources PDCCH transmission via control circuit 208. The downlink control information is then mapped to the configured REs via mapping circuit 205. The downlink control information carried in PDCCH is then modulated and encoded via encoder 204 to be transmitted by transceiver 206 via antenna 207. UE 211 receives the PDCCH configuration and the downlink control information by transceiver 216 via antenna 217. UE 211 determines the configured radio resources via control circuit 218 and de-maps the configured REs via de-mapping circuit 215. UE 211 then demodulates and decodes the downlink information via decoder 214.

Figure 3:
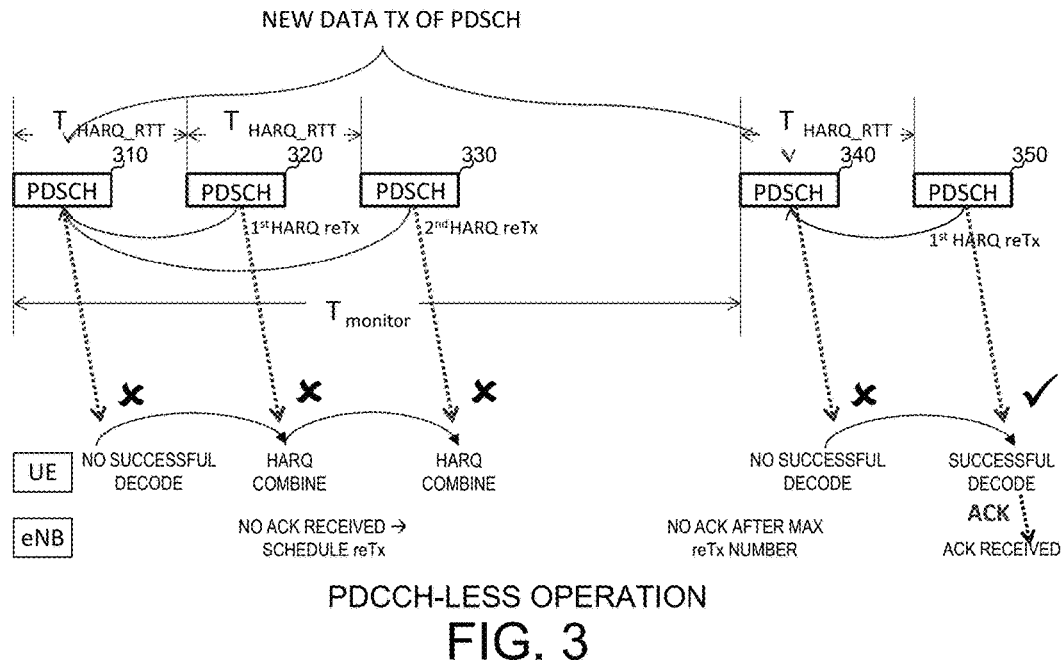
FIG. 3 illustrates one embodiment of PDCCH-less operation for data transmission.

FIG. 3 illustrates one embodiment of PDCCH-less operation for data transmission. Without receiving control and scheduling information via PDCCH, the NB-IoT/NR device will blindly decode some PDSCH subframes according to predefined parameters configured by higher layer, e.g., via Radio Resource Control (RRC) signaling. The predefined parameters may include, but not limited to: the PDSCH monitoring occasion (which subframes to decode), the number of transport format combination (e.g., maximum 4 set) including transport block size and modulation information. The activation and deactivation of such PDCCH-less operation can be done via higher layer signaling or using a new DCI. The blind decoding of the related parameters determination can be predefined in the specification, can be signaled via higher layer, or using a new DCI, or the combination of the above.

Under PDCCH-less operation, Hybrid automatic repeat request (HARQ) retransmission can also be realized without PDCCH. If UE does not successfully decode the $1^{st}$ PDSCH transmission, eNB will send the $1^{st}$ (and $2^{nd}$, or necessary) retransmission of PDSCH upon the predefined occasion. In practice, incorrectly received coded data blocks are often stored at the receiver rather than discarded, and when the re-transmitted block is received, the two blocks are combined. This is called Hybrid ARQ with soft combining. While it is possible that two given transmissions cannot be independently decoded without error, it may happen that the combination of the previously erroneously received transmissions gives us enough information to correctly decode. With predefined rules, UE knows how to perform HARQ soft combining.

As illustrated in FIG. 3, a base station configures the PDSCH monitoring occasion and a number of transport format combination for UE (e.g., an NB-IoT/NR device) by higher layer signaling. The base station also activates PDCCH-less data transmission via higher layer signaling or via new DCI. The base station then performs data transmission over the configured PDSCH occasion. In the example of FIG. 3, the UE is configured to monitor PDSCHs over duration $T_{MONITOR}$. The UE first receives PDSCH 310 for new data, but is not able to successfully decode the data. The UE does not send any HARQ ACK or NACK to the base station. Upon not receiving the HARQ ACK for predefined occasions (e.g., HARQ_RTT), the base station retransmits the data for the $1^{st}$ HARQ re-transmission over the second PDSCH 320. Again, the UE is not able to successfully decode the data even after performing HARQ soft combining, and does not send any HARQ ACK or NACK to the base station. The base station then retransmits the data for the $2^{nd}$ HARQ re-transmission over the third PDSCH 330. Again, the UE is not able to successfully decode the data even after performing HARQ soft combining, and so on so forth. If the base station does not receive the HARQ ACK after a maximum number of retransmission, then radio link control (RLC) layer retransmission may be triggered. The UE then receives PDSCH 340 for new data, but again is not able to successfully decode the data. Finally, upon receiving the $1^{st}$ HARQ retransmission over PDSCH 350, the UE is able to successfully decode the data. The UE then sends an HARQ ACK to the base station.

Figure 4:
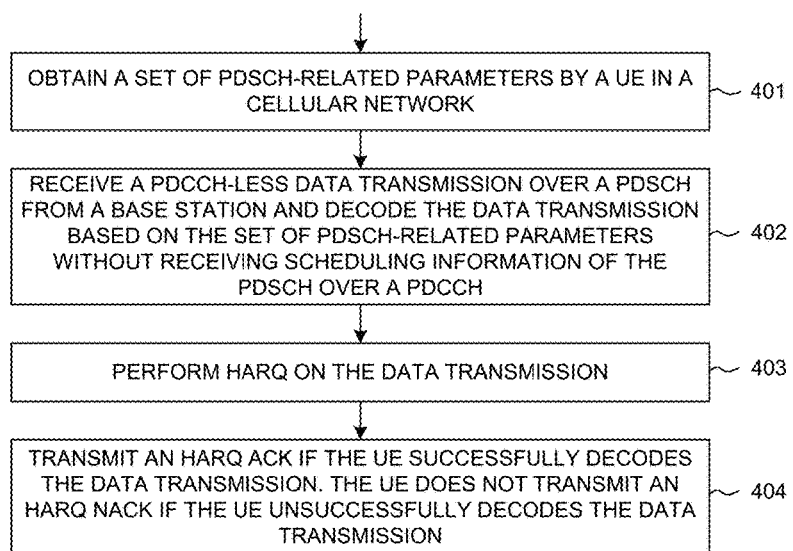
FIG. 4 is a flow chart of a method of PDCCH-less operation for data transmission from UE perspective in accordance with one novel aspect.

FIG. 4 is a flow chart of a method of PDCCH-less operation for data transmission from UE perspective in accordance with one novel aspect. In step 401, a UE (e.g., an NB-IoT/NR device) obtains a set of PDSCH-related parameters in a cellular network. In step 402, the UE receives a PDCCH-less data transmission over a PDSCH from a base station. The UE decodes the data transmission based on the set of PDSCH-related parameters without receiving scheduling information of the PDSCH over a PDCCH. In step 403, the UE performs HARQ on the data transmission. In step 404, the UE transmits an HARQ ACK if the UE successfully decodes the data transmission. The UE does not transmit an HARQ NACK if the UE unsuccessfully decodes the data transmission.

Figure 5:
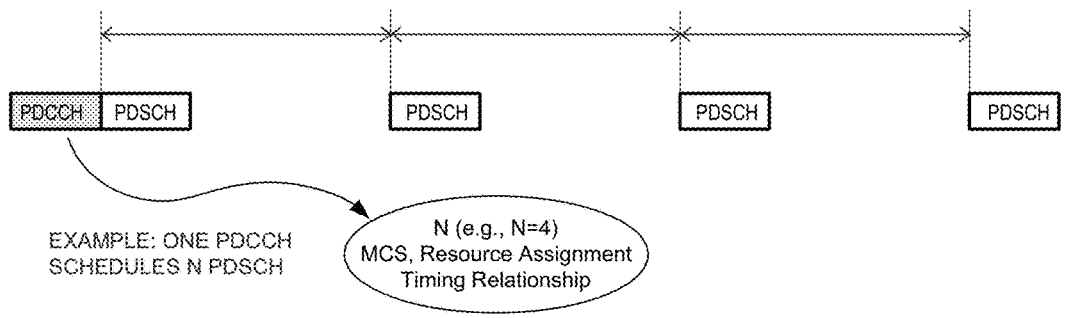
FIG. 5 illustrates one embodiment of PDCCH-lite operation for data transmission.

FIG. 5 illustrates one embodiment of PDCCH-lite operation for data transmission. Different from PDCCH-less operation, the NB-IoT/NR device may use one PDCCH to schedule more than one subsequent PDSCH resources for data transmission, which is referred to as PDCCH-lite operation. As illustrated in FIG. 5, under PDCCH-lite operation, the base station use one PDCCH to schedule N (e.g., N=4) subsequence PDSCH resources (e.g., subframes). The value of N is indicated in DCI carried by the PDCCH. The N PDSCHs may use the same or different MCS or resource assignment. The N PDSCHs may have predefined timing relationship, e.g., separated by a predefined number of subframes with each other. The method is also applicable to PUSCH transmission, i.e., one PDCCH to schedule N subsequent PUSCH resources.

Figure 6:
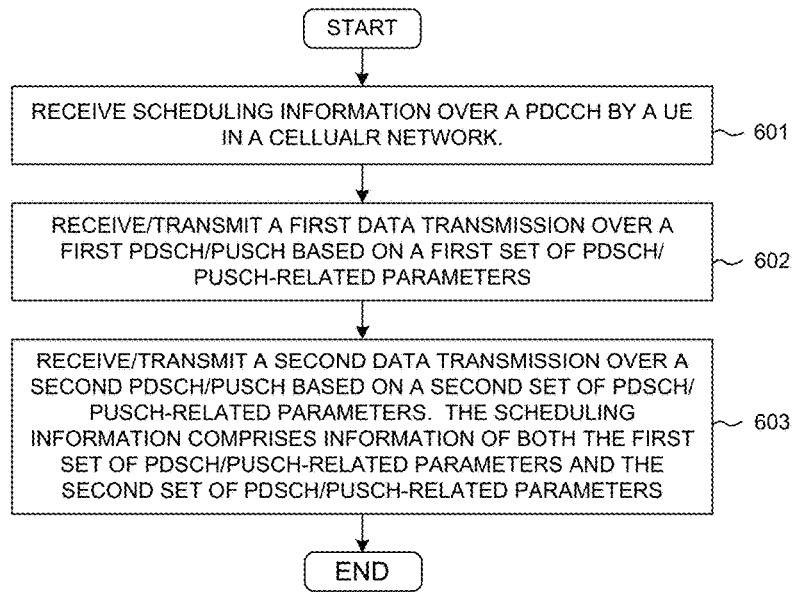
FIG. 6 is a flow chart of a method of PDCCH-lite operation for data transmission from UE perspective in accordance with one novel aspect.

FIG. 6 is a flow chart of a method of PDCCH-lite operation for data transmission from UE perspective in accordance with one novel aspect. In step 601, a UE (e.g., an NB-IoT/NR device) receives scheduling information over a PDCCH in a cellular network. In step 602, the UE receives or transmits a first data transmission over a first PDSCH/PUSCH based on a first set of PDSCH/PUSCH-related parameters. In step 603, the UE receives or transmits a second data transmission over a second PDSCH/PUSCH based on a second set of PDSCH/PUSCH-related parameters. The scheduling information comprises information of both the first set of PDSCH/PUSCH-related parameters and the second set of PDSCH/PUSCH-related parameters.

Figures 7, 8:
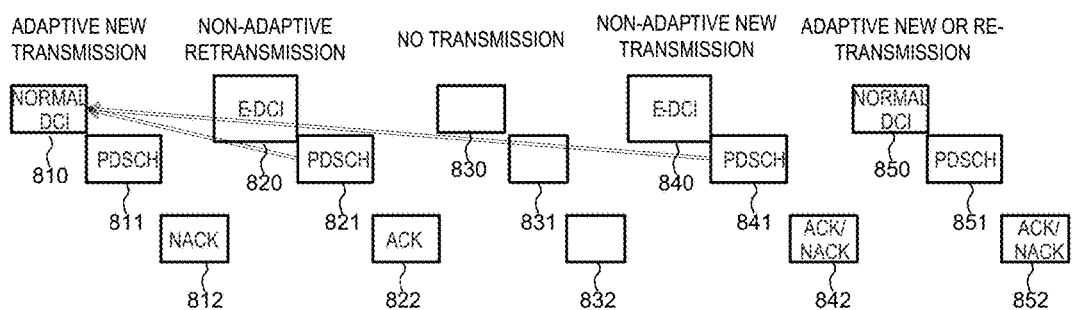
FIG. 7 illustrates one embodiment of extremely compact DCI for data transmission.
FIG. 8 illustrates one example of NB-IoT/NR downlink behavior using extremely compact DCI for data transmission.

FIG. 7 illustrates one embodiment of extremely compact DCI for data transmission. As depicted by table 700 of FIG. 7, a normal DCI comprises the following contents: UL/DL flag, PRB assignment, repetition number, MCS, redundancy version (RV), new data indication (NDI), HARQ ACK resource offset, and other parameters. For extremely compact DCI, the network may choose to use the same "PRB assignment, repetition number, MCS, and RV" for scheduling DL/UL data transmission for NB-IoT/NR devices. As a result, those contents do not need to be included in the extremely compact DCI (E-DCI). Therefore, the E-DCI only needs to include UL/DL flag, NDI, and HARQ ACK resource offset. The concept of E-DCI can be applied to both downlink and uplink data transmission, and both new data transmission and retransmission as indicated by the NDI parameter.

FIG. 8 illustrates one example of NB-IoT/NR downlink behavior using extremely compact DCI for data transmission. For normal DCI, adaptive transmission can be applied, where the base station can change transport block size, MCS, and other parameters. For E-DCI, non-adaptive transmission can be applied, where the base station keeps the same transport block size, MCS, and other parameters. New transmission or retransmission depends on the NDI parameter of DCI. In the example of FIG. 8, the base station first sends a normal DCI via PDCCH 810. The normal DCI 810 contains all necessary parameters for subsequent downlink transmission via PDSCH. The normal DCI 810 also indicates that it is a new transmission. The base station then transmits new data via PDSCH 811, which is scheduled by normal DCI 810. If the UE is not able to successfully decode the data, then the base station receives an HARQ NACK 812. The base station then decides to switch from adaptive transmission to non-adaptive transmission. Accordingly, the base station sends an E-DCI via PDCCH 820. The E-DCI 820 only contains UL/DL flag, NDI, and HARQ ACK resource offset, while the remaining parameters are the same as provided by normal DCI 810. The base station then performs retransmission of the data via PDSCH 821, which is scheduled by both E-DCI 820 and normal DCI 810. When the UE successfully decodes the data, the base station receives an HARQ ACK 822, which completes the downlink data transmission. No downlink data transmission occurs for candidate PDCCH 830.

Later, the base station sends an E-DCI via PDCCH 840. The E-DCI 840 only contains UL/DL flag, NDI, and HARQ ACK resource offset, while the remaining parameters are the same as provided by normal DCI 810. The E-DCI 840 also indicates that it is a new transmission. The base station then performs new data transmission via PDSCH 841, which is scheduled by both E-DCI 840 and normal DCI 810. When the UE successfully or unsuccessfully decodes the data, the base station receives an HARQ ACK or NACK 842. The base station can switch from non-adaptive transmission to adaptive transmission dynamically. For example, the base station sends a normal DCI via PDCCH 850. The normal DCI 850 contains all necessary parameters for subsequent downlink transmission via PDSCH. The normal DCI 850 also indicates whether it is a new transmission or a retransmission. The base station then transmits or retransmits data via PDSCH 851, which is scheduled by normal DCI 850. Finally, the base station receives an HARQ ACK or NACK 852.

Figure 9:
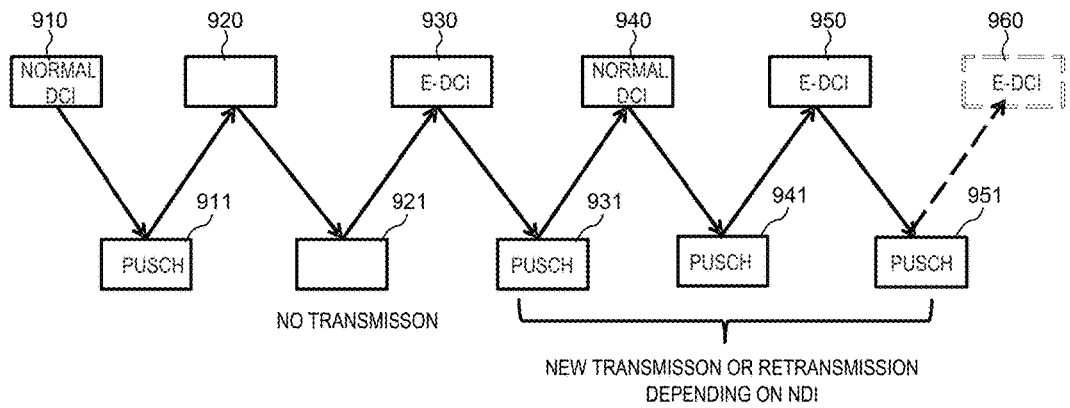
FIG. 9 illustrates another example of NB-IoT/NR uplink behavior using extremely compact DCI for data transmission.

FIG. 9 illustrates another example of NB-IoT/NR uplink behavior using extremely compact DCI for data transmission. Similar to downlink transmission, for normal DCI, adaptive transmission can be applied, where the base station can change transport block size, MCS, and other parameters. For E-DCI, non-adaptive transmission can be applied, where the base station keeps the same transport block size, MCS, and other parameters. New transmission or retransmission depends on the NDI parameter of DCI. For uplink transmission, the HARQ ACK/NACK of UL PUSCH is also implied in NDI of normal DCI/E-DCI. Possible ACK solutions of the last transmission may be 1) as indicated by E-DCI, or 2) by a timer, e.g., if there is no following DCI within a period, then it implies ACK.

In the example of FIG. 9, the base station first sends a normal DCI via PDCCH 910. The normal DCI 910 contains all necessary parameters for subsequent uplink transmission via PUSCH. The normal DCI 910 also indicates that it is a new transmission. The UE then transmits new data via PUSCH 911, which is scheduled by normal DCI 910. The base station does not schedule uplink transmission via candidate PDCCH 920. Later, the base station dynamically switches between adaptive transmission and non-adaptive transmission by sending normal DCI or E-DCI via PDCCH 930, 940, 950, and 960. The UE then transmits uplink data via corresponding PUSCH 931, 941, 951, and 961, respectively. The new data transmission or retransmission are indicated by the NDI of normal DCI/E-DCI. In one example, the base station does not transmit E-DCI 960, which implies an HARQ ACK of UL PUSCH, e.g., the last UL transmission via PUSCH 951 is successful.

Figure 10:
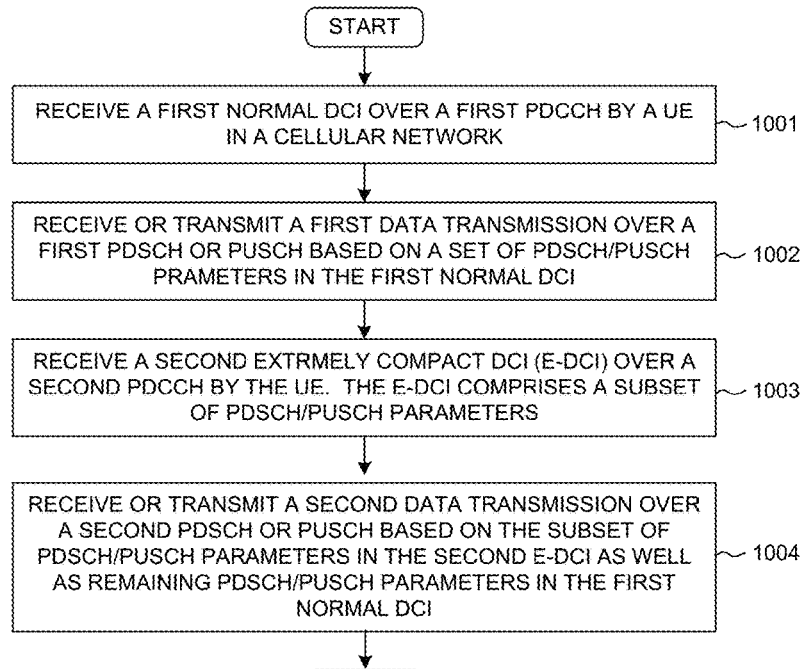
FIG. 10 is a flow chart of a method of extremely compact DCI for data transmission from UE perspective in accordance with one novel aspect.

FIG. 10 is a flow chart of a method of extremely compact DCI for data transmission from UE perspective in accordance with one novel aspect. In step 1001, a UE (e.g., an NB-IoT/NR device) receives a first normal downlink control information (DCI) over a first physical downlink control channel (PDCCH) in a cellular network. In step 1002, the UE receives or transmits a first data transmission over a first physical downlink/uplink shared channel (PDSCH/PUSCH) based on a set of PDSCH/PUSCH parameters in the first normal DCI. In step 1003, the UE receives a second extremely compact DCI (E-DCI) over a second PDCCH. The E-DCI comprises a subset of PDSCH/PUSCH parameters. In step 1004, the UE receives or transmits a second data transmission over a second PDSCH/PUSCH based on the subset of PDSCH/PUSCH parameters in the second E-DCI as well as remaining PDSCH/PUSCH parameters in the first normal DCI.

Figure 11:
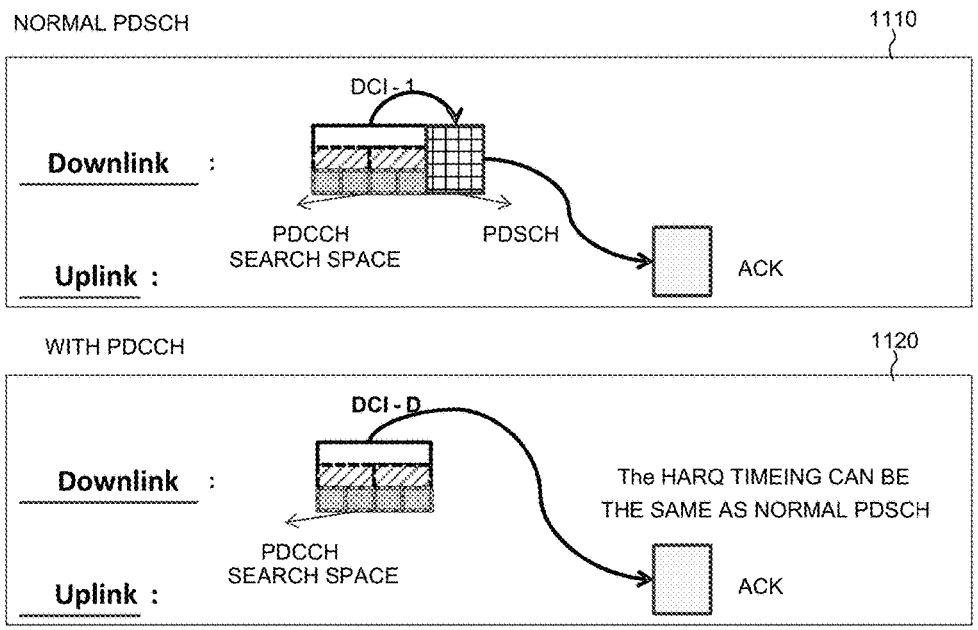
FIG. 11 illustrates one embodiment of data transmission in PDCCH.

FIG. 11 illustrates one embodiment of data transmission in PDCCH. Data transmission can be transmitted over data shared channel (DSCH) in higher layer or others. For example, data can be transmitted over paging channel (PCH) or via RRC signaling. For dynamic data transmission, however, the basic operation is that DSCH is transmitted by PDSCH, and the assignment information of the PDSCH is transmitted by PDCCH. In accordance with one novel aspect, to reduce control channel overhead, DSCH is transmitted directly by PDCCH. By defining a new DCI format for PDCCH, data can be transmitted in PDCCH directly. The new DCI format, e.g., DCI Format D (DCI-D) contains data directly without any control information. In the current LTE specification, DCI size if about 30~50 bits. For the new DCI format, the DCI size can be larger, e.g., 8 bytes=64 bits. The new DCI will be conveyed by PDCCH, and the UE may be configured with a new transmission mode, e.g. TM-D.

The top diagram 1110 of FIG. 11 depicts data transmission of DSCH under normal PDSCH. The bottom diagram 1120 of FIG. 11 depicts data transmission of DSCH under PDCCH, where the UE is configured with a new transmission mode TM-D. Under the new transmission mode, the UE is specified to monitor, for example, DCI-1A and DCI-D. The PDCCH monitoring behavior for DCI-D is the same as the legacy behavior. The UE will perform blind decoding over the predefined search space in the downlink. If DCI-D is successfully decoded, then the UE can directly pass the associated payload to MAC layer for further processing. Upon the successful decoding of DCI-D, the UE will transmit an HARQ ACK to the base station in the uplink, or the base station will keep transmitting DCI-D in the subsequent PDCCH occasion. According to different design consideration, DSCH on PDCCH may or may not have HARQ retransmission. In one embodiment, the HARQ retransmission mechanism address in PDCCH-less operation can also be applied. Under such HARQ retransmission mechanism, the UE will not transmit any NACK to the base station if the UE cannot successfully decode DCI-D, and the base station will keep transmitting DCI-D in the subsequent PDCCH occasion until receiving an ACK from the UE.

Figure 12:
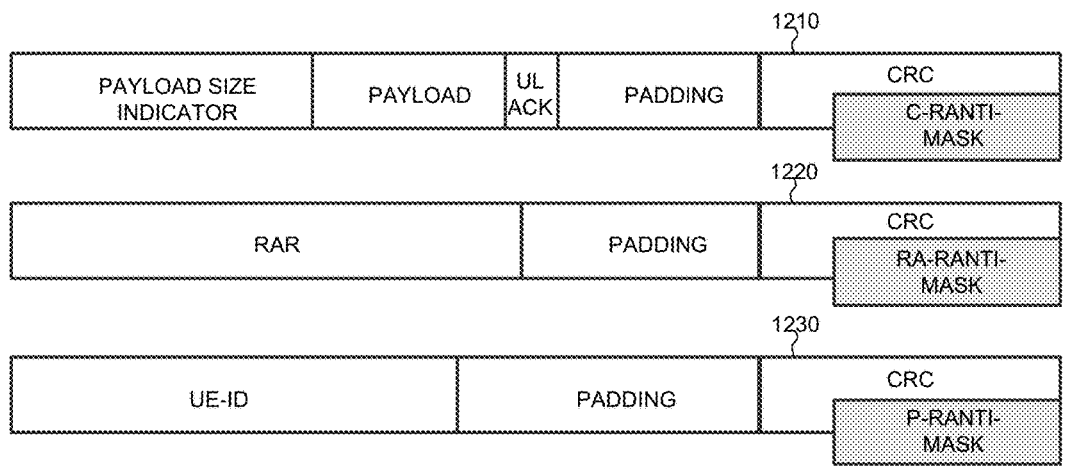
FIG. 12 illustrates one example of data transmission in PDCCH using a new DCI format.

FIG. 12 illustrates one example of data transmission in PDCCH using a new DCI format. In the example of FIG. 12, a new DCI format DCI-D is introduced in PDCCH. The DCI-D has a fixed size (e.g., 64 bits). For C-RNTI, DCI-D 1210 contains payload size indicator, payload, UL ACK, padding, and CRC. For RA-RNTI, DCI-D 1220 contains random access response (RAR), padding, and CRC. Some information can be replaced by additional mask. Similar to that CRC of LTE PBCH MIB is masked additionally for different antenna ports number. For P-RNTI, DCI-D 1230 contains UE-ID, padding, and CRC. The CRC field can be 24 bits, and the RNTI fields can be masked in the last 16 bits of the CRC.

Figure 13:
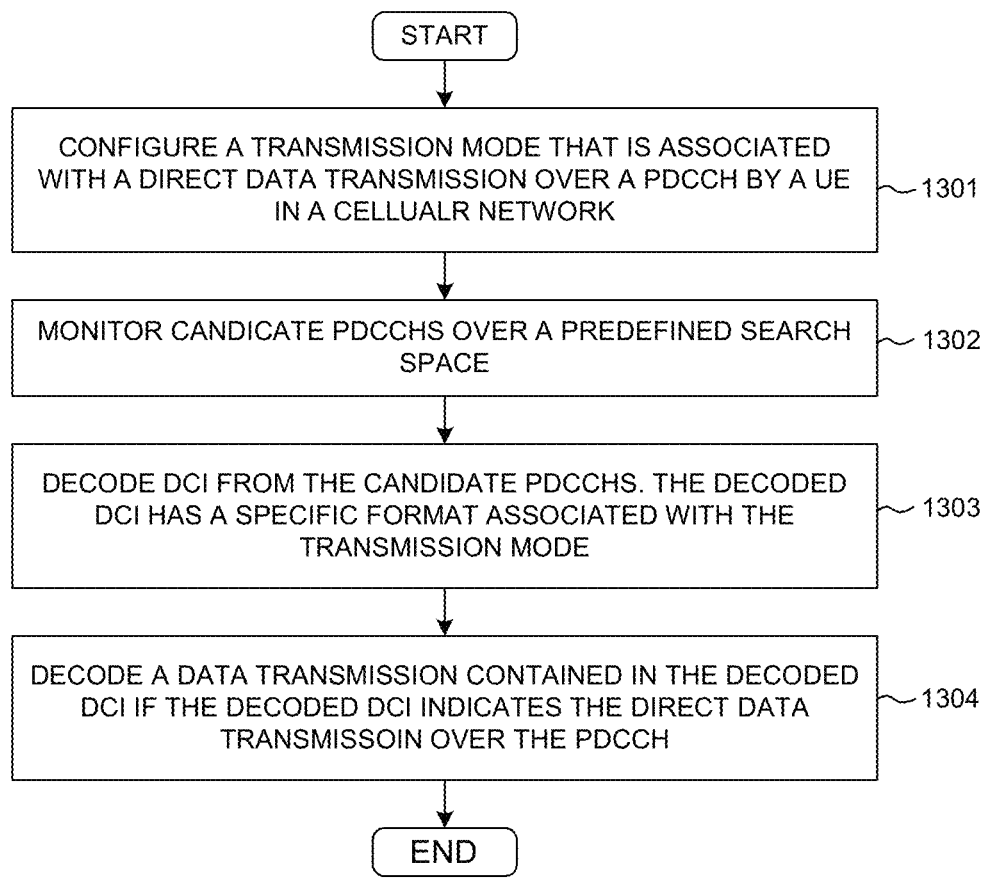
FIG. 13 is a flow chart of a method of data transmission in PDCCH from UE perspective in accordance with one novel aspect.

FIG. 13 is a flow chart of a method of data transmission in PDCCH from UE perspective in accordance with one novel aspect. In step 1301, a UE (e.g., an NB-IoT/NR device) configures a transmission mode that is associated with a direct data transmission over a physical downlink control channel (PDCCH) in a cellular network. In step 1302, the UE monitors candidate PDCCHs over a predefined search space. In step 1303, the UE decodes downlink control information (DCI) from the candidate PDCCHs. The decoded DCI has a specific format associated with the transmission mode. In step 1304, the UE decodes the direct data transmission contained in the decoded DCI if the decoded DCI indicates the direct data transmission over the PDCCH.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   obtaining a set of physical downlink shared channel-related (PDSCH-related) parameters by a user equipment (UE), wherein the PDSCH-related parameters are obtained via a radio resource control (RRC) layer signaling message from a base station; and
   receiving a physical downlink control channel-less (PDCCH-less) data transmission over a PDSCH from the base station and decoding the data transmission based on the set of PDSCH-related parameters without receiving scheduling information of the PDSCH over a PDCCH.

2. The method of claim 1, wherein the set of PDSCH-related parameters comprises at least one of subframes of the PDSCH, periodicity of the PDSCH, a transport block size, and a modulation and coding scheme.

3. The method of claim 1, further comprising:
   performing hybrid automatic repeat request (HARQ) on the data transmission; and
   transmitting an HARQ ACK if the UE successfully decodes the data transmission, wherein the UE does not transmit an HARQ NACK if the UE unsuccessfully decodes the data transmission.

4. The method of claim 3, wherein the UE receives a PDCCH-less retransmission of the data transmission from the base station if the UE does not transmit the HARQ ACK within a predefined time period.

5. The method of claim 3, wherein the UE performs HARQ soft combining on the data transmission and the retransmission.

6. A method, comprising:
   receiving scheduling information over a physical downlink control channel (PDCCH) by a user equipment (UE), wherein the PDCCH has a time-frequency radio resource location;
   receiving/transmitting a first data transmission over a first physical downlink/uplink shared channel (PDSCH/PUSCH) based on a first set of PDSCH/PUSCH-related parameters; and
   receiving/transmitting a second data transmission over a second PDSCH/PUSCH based on a second set of PDSCH/PUSCH-related parameters, wherein information of both the first set of PDSCH/PUSCH-related parameters and the second set of PDSCH/PUSCH-related parameters are carried by the scheduling information over the same PDCCH having the same time-frequency radio resource location.

7. The method of claim 6, wherein the scheduling information comprises N sets of subsequent PDSCH/PUSCH-related parameters, wherein N is greater than one.

8. The method of claim 7, wherein the N sets of subsequent PDSCH/PUSCH-related parameters share the same modulation and coding scheme.

9. The method of claim 7, wherein the N subsequent PDSCHs/PUSCHs have predefined timing relationship.

10. A method, comprising:
    receiving a first normal downlink control information (DCI) over a first physical downlink control channel (PDCCH) by a user equipment (UE);

receiving/transmitting a first data transmission over a first physical downlink/uplink shared channel (PDSCH/PUSCH) based on a set of PDSCH/PUSCH parameters in the first normal DCI;

receiving a second extremely compact DCI (E-DCI) over a second PDCCH by the UE, wherein the E-DCI comprises a subset of PDSCH/PUSCH parameters; and receiving/transmitting a second data transmission over a second PDSCH/PUSCH, wherein the second data transmission is received or transmitted using both the subset of PDSCH/PUSCH parameters in the second E-DCI as well as remaining PDSCH/PUSCH parameters in the first normal DCI.

11. The method of claim 10, wherein the set of PDSCH/PUSCH parameters comprises a downlink or uplink flag, resource assignment, a repetition number, a modulation and coding scheme, a redundancy version, a new data indicator, and an HARQ ACK resource offset.

12. The method of claim 10, wherein the subset of PDSCH/PUSCH parameters comprises a downlink or uplink flag, a new data indicator, and an HARQ ACK resource offset.

13. The method of claim 10, wherein a new data indicator (NDI) is contained in both normal DCI and E-DCI to indicate new data transmission or data retransmission.

14. The method of claim 10, wherein the UE performs uplink transmission over a PUSCH, and wherein the UE receives an ACK or NACK contained in a subsequent DCI.

15. The method of claim 10, wherein the UE performs uplink transmission over a PUSCH, and wherein the UE determines an ACK or NACK based on a timer.

16. A method, comprising:
configuring a transmission mode that is associated with a direct data transmission over a physical downlink control channel (PDCCH) by a user equipment (UE);

monitoring candidate PDCCHs over a predefined search space;

decoding downlink control information (DCI) from the candidate PDCCHs, wherein the decoded DCI has a specific format associated with the transmission mode; and decoding the direct data transmission contained in the decoded DCI if the decoded DCI indicates the direct data transmission over the PDCCH, wherein the UE does not decode any subsequent data transmission over a data channel that is scheduled by the DCI.

17. The method of claim 16, wherein the decoded DCI comprises a cell radio network temporary identifier (C-RNTI), and wherein the decoded DCI also comprises a payload size followed by a payload.

18. The method of claim 16, wherein the decoded DCI comprises a random-access radio network temporary identifier (RA-RNTI), and wherein the decoded DCI also comprises a random-access response (RAR).

19. The method of claim 16, wherein the decoded DCI comprises a paging radio network temporary identifier (P-RNTI), and wherein the decoded DCI also comprises a UE-ID.

20. The method of claim 16, wherein the UE transmits an HARQ ACK only if the UE successfully decodes the data transmission, and wherein the UE does not transmit an HARQ NACK if the UE unsuccessfully decodes the data transmission.

* * * * *